United States Patent
Noda

(10) Patent No.: US 8,488,286 B2
(45) Date of Patent: Jul. 16, 2013

(54) APPARATUS FOR ELECTRIC POWER TOOL AND RECORDING MEDIUM

(75) Inventor: Masafumi Noda, Anjo (JP)

(73) Assignee: Makita Corporation, Anjo (JP)

( * ) Notice: Subject to any disclaimer, the term of this patent is extended or adjusted under 35 U.S.C. 154(b) by 71 days.

(21) Appl. No.: 13/337,903

(22) Filed: Dec. 27, 2011

(65) Prior Publication Data

US 2012/0162840 A1 Jun. 28, 2012

(30) Foreign Application Priority Data

Dec. 27, 2010 (JP) ................. 2010-290878

(51) Int. Cl.
*H02H 3/42* (2006.01)
(52) U.S. Cl.
USPC ............................................ 361/78; 361/87
(58) Field of Classification Search
USPC ........................... 361/78, 87, 93.8
See application file for complete search history.

(56) References Cited

U.S. PATENT DOCUMENTS

| 2006/0267556 A1 | 11/2006 | Uehlein-Proctor et al. |
| 2007/0139847 A1* | 6/2007 | Liu ............................ 361/115 |
| 2011/0037435 A1* | 2/2011 | Funabashi et al. ............ 320/136 |

FOREIGN PATENT DOCUMENTS

| JP | A-5-220677 | 8/1993 |
| JP | A-7-282858 | 10/1995 |
| JP | A-2004-173471 | 6/2004 |
| JP | A-2005-151794 | 6/2005 |
| JP | A-2006-321043 | 11/2006 |

* cited by examiner

*Primary Examiner* — Danny Nguyen
(74) *Attorney, Agent, or Firm* — Oliff & Berridge, PLC

(57) ABSTRACT

An apparatus for an electric power tool includes a detection unit, a determination unit, a protection unit, a calculation unit, and a notification unit. The calculation unit calculates a time-equivalent value representing a remaining time until a load condition of a battery reaches an overload state, in which the protection unit interrupts a discharge path, based on the result of the detection by the detection unit. The notification unit notifies a user of the electric power tool of a remaining time until the protection unit interrupts the discharge path based on the time-equivalent value calculated by the calculation unit.

6 Claims, 11 Drawing Sheets

FIG.4A

INDICATION OF REMAINING CAPACITY (INDICATOR SW DEPRESSED)

| REMAINING CAPACITY | LED1 | LED2 | LED3 | LED4 |
|---|---|---|---|---|
| 75%~100% | ON | ON | ON | ON |
| 50%~75% | ON | ON | ON | OFF |
| 25%~50% | ON | ON | OFF | OFF |
| 0~25% | ON | OFF | OFF | OFF |

FIG.4B

INDICATION OF REMAINING TIME UNTIL OVERLOAD PROTECTION ACTIVATES

| OVERCURRENT COUNTER ($\alpha 4 > \alpha 3 > \alpha 2 > \alpha 1$) | LED1 | LED2 | LED3 | LED4 |
|---|---|---|---|---|
| OVERCURRENT COUNTER $> \alpha 1$ | BLINK | BLINK | BLINK | BLINK |
| OVERCURRENT COUNTER $> \alpha 2$ | BLINK | BLINK | BLINK | OFF |
| OVERCURRENT COUNTER $> \alpha 3$ | BLINK | BLINK | OFF | OFF |
| OVERCURRENT COUNTER $> \alpha 4$ | BLINK | OFF | OFF | OFF |

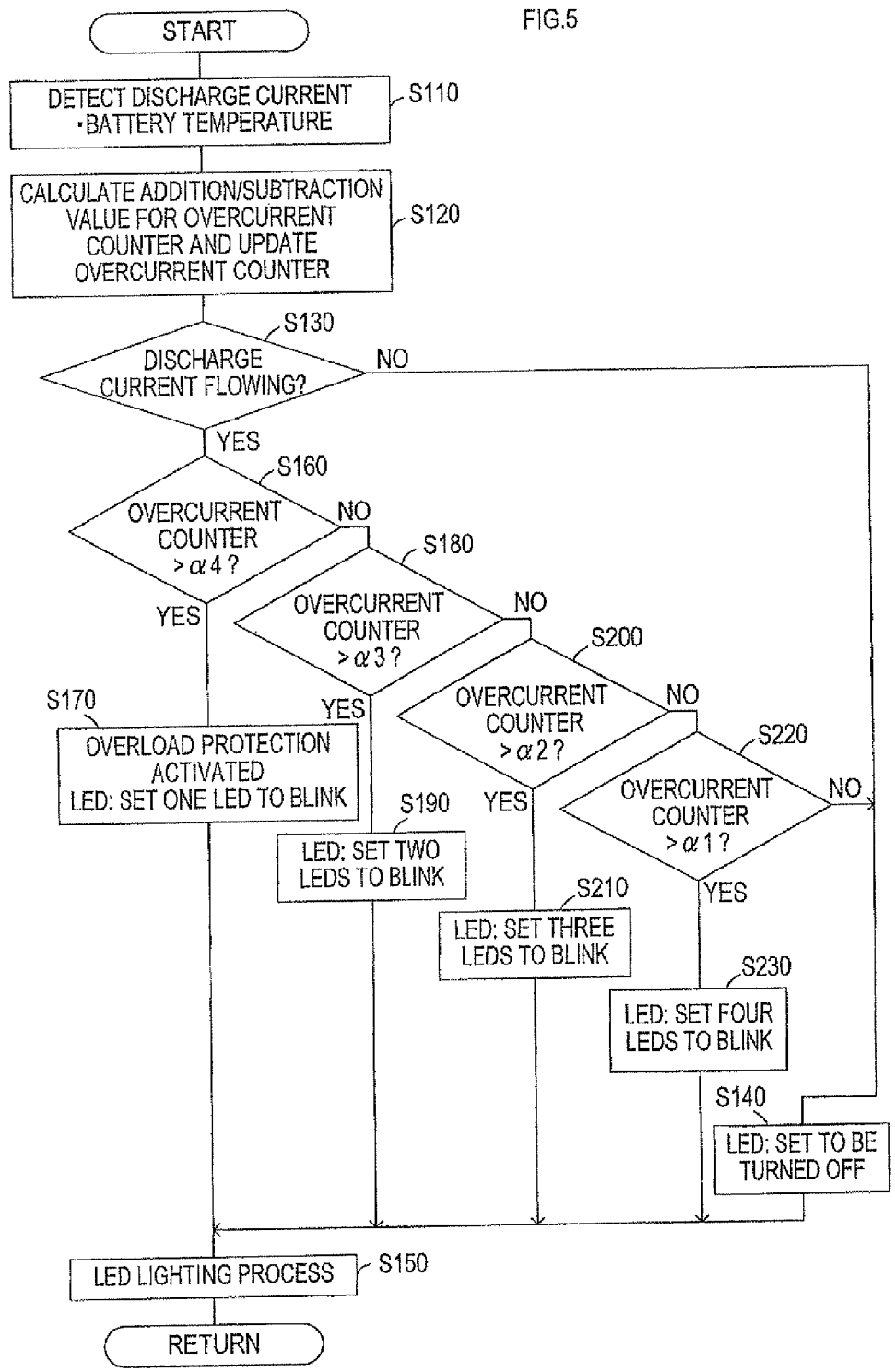

APPARATUS FOR ELECTRIC POWER TOOL AND RECORDING MEDIUM

CROSS-REFERENCE TO RELATED APPLICATIONS

This application claims the benefit of Japanese Patent Application No. 2010-290878 filed Dec. 27, 2010 in the Japan Patent Office, the disclosure of which is incorporated herein by reference.

BACKGROUND

The present invention relates to an apparatus for an electric power tool provided with an overload protection function that serves to detect, when a battery discharges, an overload state of the battery and interrupts a discharge path.

An apparatus for an electric power tool provided with such overload protection function has a problem that: when the battery has reached the overload state during use of the electric power tool, a discharge path from the battery is interrupted and operation of the electric power tool is stopped without any advance notice to a user of the electric power tool.

In order to address the problem, an example apparatus for an electric power tool disclosed, for example, in Japanese Unexamined Patent Application Publication No. 2004-173471 is configured to include a shunt resistor for detecting current in the discharge path from the battery to the motor, detect a load level of the motor (and thus of the battery) based on a voltage between both ends of the shunt resistor, and indicate the load level using a plurality of indicator elements.

SUMMARY

According to the example apparatus, the user can detect the load level of the battery from a lighting state of the indicator elements, and therefore can operate the electric power tool while predicting an activation of the overload protection.

However, since only the load level of the battery is indicated in the example apparatus, the user cannot know a time until an operation of the electric power tool is stopped by the overload protection function (in other words, a time until an activation of the overload protection).

Therefore, it is difficult for the user to use the electric power tool such that the electric power tool is prevented from being stopped despite the user's intention due to the overload protection function. Accordingly, such a problem may occur that the electric power tool is stopped in an inconvenient manner in some conditions of use.

In one aspect of the present invention, it is preferable to be able to notify a user of an electric power tool of a time until overload protection activates during discharge from the battery of the electric power tool.

An apparatus for an electric power tool in a first aspect of the present invention includes; a detection unit, a determination unit, protection unit, calculation unit and a notification unit.

The detection unit detects at least one physical quantity representing a load condition of a battery as a power source of the electric power tool, and the determination unit determines, based on the result of the detection by the detection unit, whether or not the battery has reached an overload state.

The protection unit interrupts a discharge path from the battery to thereby protect the battery when the determination unit determines that the battery has reached the overload state.

The calculation unit calculates, based on the result of the detection by the detection unit, a time-equivalent value representing a remaining time until the load condition of the battery reaches the overload state, which the protection unit interrupts the discharge path.

The notification unit notifies a user of the electric power tool of a remaining time until the protection unit interrupts the discharge path based on the time-equivalent value calculated by the calculation unit.

According to the apparatus of the present invention, the user can recognize a remaining time until the protection unit stops the operation of the electric power tool during use of the electric power tool.

Accordingly, the user can temporarily terminate an operation with use of the electric power tool and stop driving of the electric power tool. Thus, the electric power tool can be suppressed from being unusable for a long time period from when operation of the electric power tool is forcibly stopped by the protection unit until when it is determined that the electric power tool has recovered to a normal state.

The calculation unit may have any configuration as long as the calculation unit is capable of calculating, based on the result of the detection by the detection unit, a time until the load condition of the battery reaches the overload state and the protection unit interrupts the discharge path from the battery as the time-equivalent value. For example, the result of the detection by the detection unit which is to be used for determination about the overload state by the determination unit may be used to calculate the time-equivalent value.

Therefore, in a case where the detection unit detects a temperature of the battery as the at least one physical quantity, the calculation unit may calculate the time-equivalent value based on the temperature of the battery detected by the detection unit.

In a case where the detection unit detects a discharge current flowing in the discharge path from the battery as the at least one physical quantity, the calculation unit may calculate the time-equivalent value based on the discharge current detected by the detection unit.

In a case where the detection unit detects a temperature of the battery and a discharge current flowing in the discharge path as the at least one physical quantity, the calculation unit may calculate the time-equivalent value based on the temperature of the battery and the discharge current detected by the detection unit.

The notification unit may have any configuration as long as the notification unit is capable of notifying a user, based on the time-equivalent value calculated by the calculation unit, of a remaining time until the battery reaches the overload state and the protection unit interrupts the discharge path from the battery.

The notification of the remaining time may be, for example, an auditory notification by a buzzer or a voice, a visual notification using an indicator element such as an LED, or a combination of these notifications.

In a case of giving a visual notification, an indicator element for indicating a remaining capacity of the battery is usually provided to the apparatus for the electric power tool (specifically, an electric power tool main body, a battery pack to be attached to the electric power tool main body, and the like). In this case, the notification unit may control the indicator element, in a different manner of indication from a manner of indication of the remaining capacity of the battery, to thereby notify the user of the remaining time until the protection unit interrupts the discharge path.

With this configuration, it is possible to notify the user of the remaining time using the indicator element for indicating the remaining capacity, and it is possible to give a visual notification without providing a separate indicator element for indication of the remaining time. Accordingly, a constitution of the notification unit may be simplified, to thereby reduce a manufacturing cost of the apparatus for the electric power tool.

A non-transitory recording medium readable by a computer in a second aspect of the present invention stores a program for causing the computer to execute a detection step, a determination step, a protection step, a calculation step, and a notification step.

When performing the program, the computer detects, in the detection step, at least one physical quantity representing a load condition of a battery as a power source of an electric power tool. In the determination step, the computer determines whether or not the battery has reached an overload state based on the result of the detection in the detection step. When it is determined in the determination step that the battery has reached the overload state, the computer, in the protection step, interrupts a discharge path from the battery to thereby protect the battery. In the calculation step, the computer calculates, based on the result of detection in the detection step, a time-equivalent value representing a remaining time until the load condition of the battery reaches the overload state, in which the discharge path is interrupted in the protection step. Further, in the notification step, the computer notifies a use of the electric power tool of a remaining time until the discharge path is interrupted in the protection step based on the time-equivalent value calculated in the calculation step.

According to the program, it is possible to make the computer function as part of the apparatus for the electric power tool in the first aspect.

The aforementioned computer may be a known computer, or may be a computer configured preferably to the electric power tool.

Also, the non-transitory recording medium may include, for example, a flexible disk (FD), an optical disk (MO), a DVD, a CD-ROM, a Blu-Ray disk, a HD-DVD, a hard disk, a portable semiconductor memory (such as a USB memory, a memory card, etc.), and so on.

BRIEF DESCRIPTION OF THE DRAWINGS

The present invention will now be described by way of example with reference to the accompanying drawings, in which:

FIGS. 4A and 4B are explanatory views for illustration of lighting patterns of indicator elements, in which FIG. 4A shows a lighting pattern to indicate a remaining capacity of a battery and FIG. 4B shows a lighting pattern to indicate a remaining time until overload protection activates;

FIG. 5 is a flowchart showing an overload protection determination process performed by an MCU in the battery pack;

DETAILED DESCRIPTION OF THE PREFERRED EMBODIMENTS

[Overall Configuration of Electric Power Tool]

Figure 1:
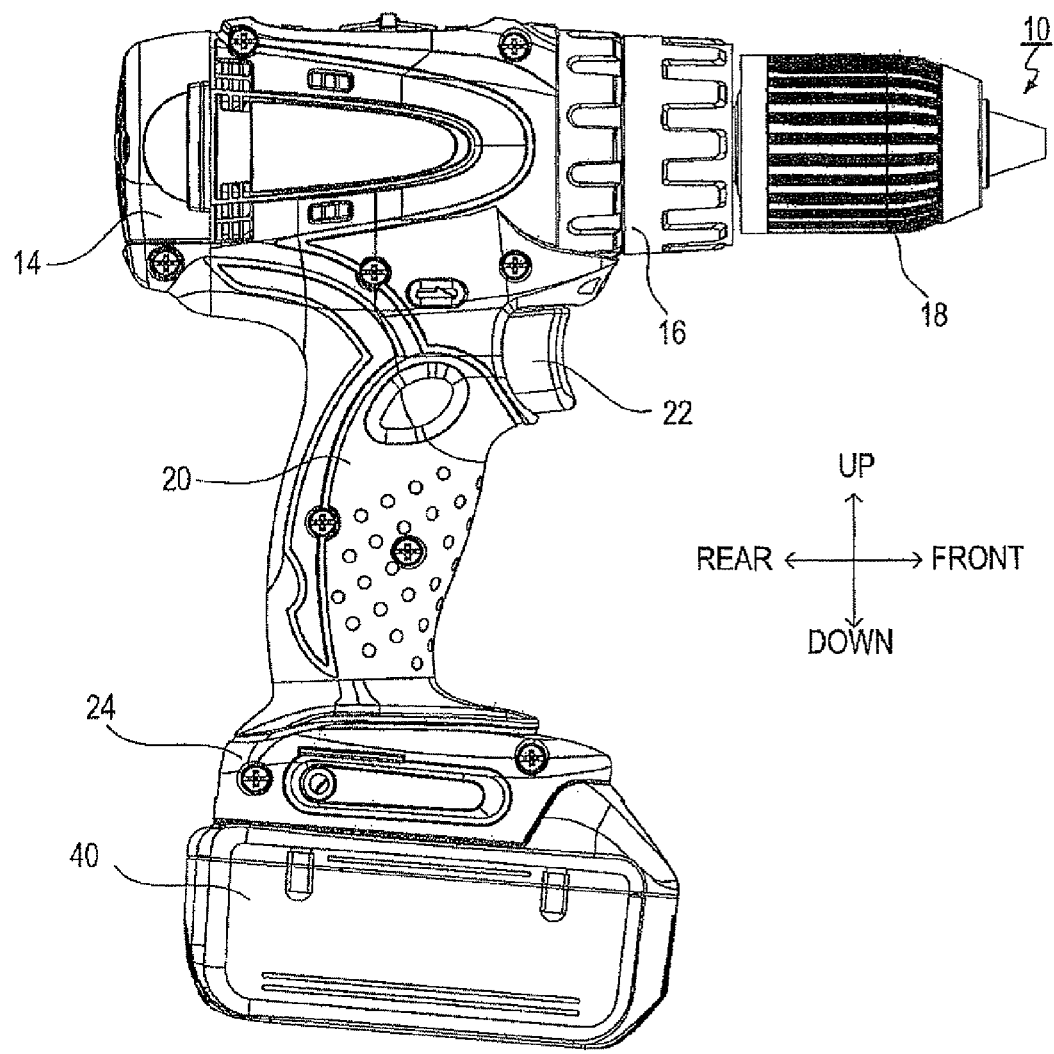
FIG. 1 is a side elevational view of an electric power tool in an embodiment of the present invention showing an overall configuration of the electric power tool.

As shown in FIG. 1, an electric power tool according to an embodiment of the present invention includes an electric power tool main body (hereinafter, also simply referred to as a "main body") 10 and a battery pack 40. The main body 10 is configured as a so-called driver drill. The battery pack 40 is detachably attached to the main body 10 to supply direct current power to the main body 10.

The main body 10 includes a motor housing 14, a gear housing 16 positioned forward from the motor housing 14, a drill chuck 18 positioned forward from the gear housing 16, and a hand grip 20 positioned below the motor housing 14.

The motor housing 14 houses a drive motor M1 (see FIG. 3) that generates driving force to rotate the drill chuck 18. The gear housing 16 houses a gear mechanism (not shown) that transmits the driving force of the drive motor M1 to the drill chuck 18. The drill chuck 18 includes an attachment mechanism (not shown) for detachable attachment of a tool bit (not shown) at a front end portion of the drill chuck 18.

The hand grip 20 is shaped such that a user of the electric power tool can hold the hand grip 20 with a single hand. At an upper front of the hand grip 20, there is provided a trigger switch 22 for the user of the electric power tool to drive or stop the drive motor M1. Also, at a lower end of the hand grip 20, a battery pack attachment portion 24 is provided to detachably attach the battery pack 40 to the main body 10. The battery pack attachment portion 24 is configured such that the battery pack 40 can be detached from the battery pack attachment portion 24 when the user of the electric power tool slides the battery pack 40 in a forward direction of the main body 10.

Figure 2:
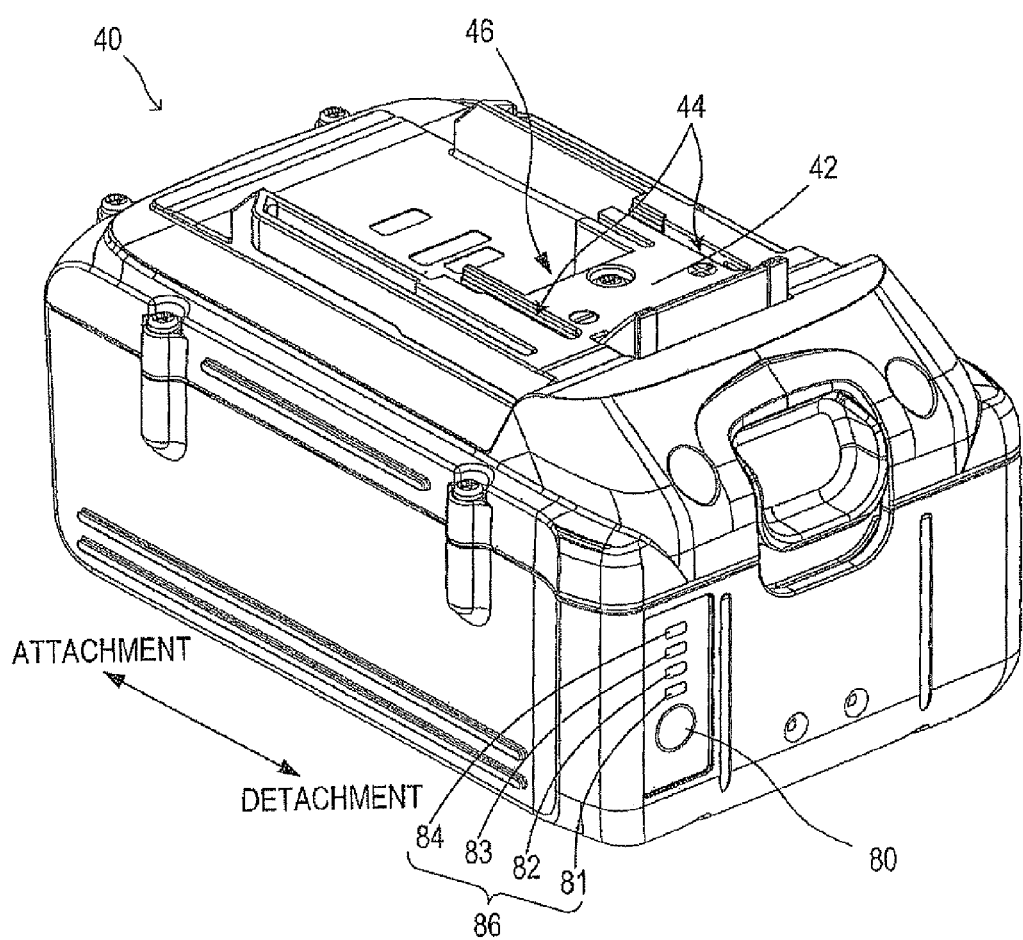
FIG. 2 is a perspective view showing an appearance of a battery pack to be attached to an electric power tool main body.

Specifically, as shown in FIG. 2, a connector portion 42 for connection to the battery pack attachment portion 24 of the main body 10 or a battery charger (not shown) is provided in an upper region of the battery pack 40. The connector portion 42 includes a power supply terminal portion 44 and a connection terminal portion 46.

Figure 3:
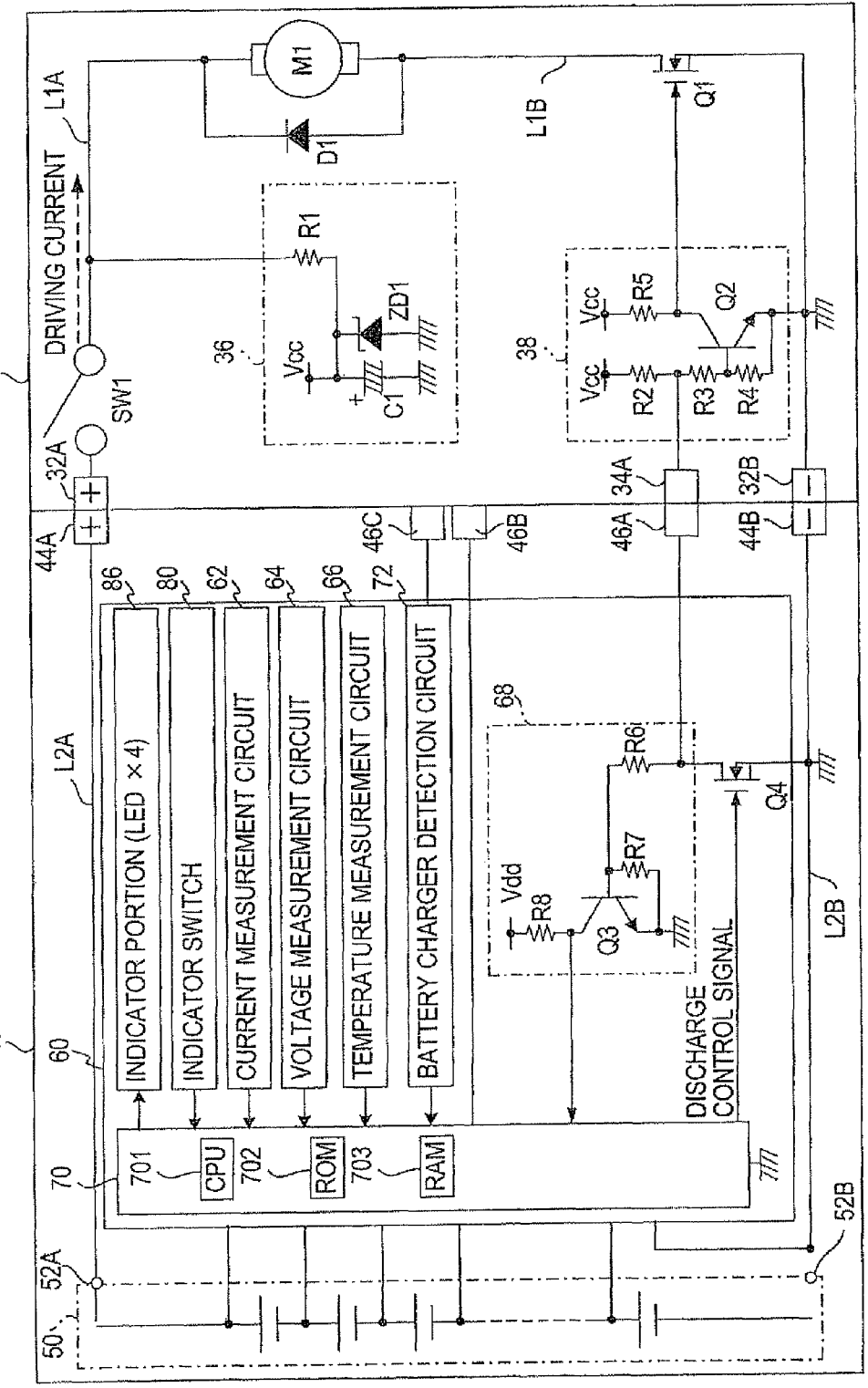
FIG. 3 is a circuit diagram showing an overall circuit configuration of the electric power tool including the battery pack.

In a housing (see FIG. 2) of the battery pack 40 provided with the connector portion 42, a battery 50, which can be charged and discharged through the connector portion 42, is contained (see FIG. 3).

When attached to the main body 10 through the connector portion 42, the battery pack 40 is electrically connected to an internal circuit of the main body 10 through the power supply terminal portion 44 and the connection terminal portion 46 provided in the connector portion 42, to thereby become capable of supplying the direct-current power to the main body 10 (see FIG. 3).

When attached to the not-shown battery charger through the connector portion 42, the battery pack 40 is electrically connected to a charging circuit of the battery charger through the power supply terminal portion 44 and the connection terminal portion 46, to thereby allow charging the battery 50 by the direct-current power supplied from the battery charger.

As shown in FIG. 2, an indicator portion 86 for indicating a remaining capacity of the battery 50 and an abnormal state is provided in a surface (in the present embodiment, a rear end surface of the battery pack 40 facing in a rearward direction of the main body 10 when the battery pack 40 is attached to the main body 10) of the housing of the battery pack 40 other than a surface with the connector portion 42.

The indicator portion 86 includes four LED indicator elements 81, 82, 83, and 84 arranged in a line. An indicator switch 80, which allows a user to direct the indicator portion 86 to indicate the remaining capacity of the battery 50 or an abnormal state, is provided at one end of the arrangement direction of the indicator elements 81, 82, 83, and 84.

[Circuit Configuration of the Electric Power Tool Main Body 10]

FIG. 3 is a circuit diagram showing an electronic circuit for controlling the drive motor M1 constituted by the battery pack 40 and the main body 10 when the battery pack 40 is attached to the main body 10.

As shown in FIG. 3, the main body 10 includes a positive terminal 32A and a negative terminal 32B for connection to the power supply terminal portion 44 of the battery pack 40 as well as a signal terminal 34A for connection to the connection terminal portion 46.

The positive terminal 32A is connected to one end of the drive motor M1 through a main switch SW1 and a positive power supply line L1A, while the negative terminal 32B is connected to the other end of the drive motor M1 through a transistor Q1 for controlling current to the drive motor M1 and a negative power supply line L1B.

In the present embodiment, the drive motor M1 which is constituted as a brushed direct current motor is energized and rotated when the transistor Q1 is turned on by an input signal from the battery pack 40 while the main switch SW1 is in an ON state.

A diode (a so-called fly-wheel diode) D1 is connected to the drive motor M1 in order to return a high voltage, which is generated in the negative power supply line L1B when the transistor Q1 is turned off, to the positive power supply line L1A.

The main switch SW1 is switchable between ON and OFF states in conjunction with the trigger switch 22. Specifically, the main switch SW1 is turned on when the trigger switch 22 is pulled, while the main switch SW1 is turned off when the trigger switch 22 is released.

The transistor Q1 employed here is an N-channel MOSFET. The main body 10 also includes a control power circuit 36 which generates a power supply voltage for driving the internal circuit and an input/output circuit 38 which inputs/outputs signals from/to the battery pack 40.

The control power circuit 36 includes a Zener diode ZD1 and a capacitor C1. A cathode of the Zener diode ZD1 is connected to the positive power supply line L1A through a resistor R1, while an anode of the Zener diode ZD1 is connected to a ground of the main body 10.

The capacitor C1 is constituted by an electrolytic capacitor. A positive terminal of the capacitor C1 is connected to the positive power supply line L1A through the resistor R1 together with the cathode of the Zener diode ZD1, while a negative terminal of the capacitor C1 is connected to the ground of the main body 10.

The negative terminal 32B is connected to the ground of the main body 10. When the battery pack 40 is attached to the main body 10, the ground of the main body 10 is connected to a negative power supply line L2B of the battery pack 40 (thus to a negative terminal 52B of the battery 50) through the negative terminal 32B.

Also, when the main switch is in the ON state, the positive power supply line L1A is connected to a positive power supply line L2A of the battery pack 40 (thus to a positive terminal 52A of the battery 50) through the positive terminal 32A.

Accordingly, in the control power circuit 36, when the main switch SW1 is in the ON state, a battery voltage (for example, a 36V direct current voltage) is applied to the anode of the Zener diode ZD1 from the positive power supply line L1A through the resistor R1, and the battery voltage is lowered to a predetermined constant voltage (for example, a 5V direct current voltage) by the Zener diode ZD1.

Then, the capacitor C1 is charged by the lowered direct current voltage, and voltage between the both terminals of the capacitor C1 is supplied to various internal circuits of the main body 10 as a power supply voltage Vcc to cause the internal circuits to operate.

The input/output circuit 38 includes a transistor Q2 and resistors R2, R3, R4, and R5. The transistor Q2 constituted as an NPN bipolar transistor has a base which is connected to the signal terminal 34A through the resistor R3 and connected to the ground of the main body 10 through the resistor R4.

The power supply voltage Vcc is applied to the signal terminal 34A through the resistor R2, and the power supply voltage Vcc is also applied to a collector of the transistor Q2 through the resister R5. The collector of the transistor Q2 is also connected to a gate of the transistor Q1, and an emitter of the transistor Q2 is connected to the ground.

Resistance values of the resistors R2, R3, and R4 are set such that the transistor Q2 is turned on when the power supply voltage Vcc has reached a predetermined voltage since the main switch SW1 was turned on, and an electric potential of the signal terminal 34A becomes a high level in a vicinity of the power supply voltage Vcc.

When the transistor Q2 is in an ON state, the gate of the transistor Q1 is connected to the ground through the transistor Q2, and thereby the transistor Q1 is in an OFF state and interrupts a current path to the drive motor M1.

When the signal terminal 34A is connected to the ground through an internal circuit (later-described transistor Q4) of the battery pack 40, the transistor Q2 becomes an OFF state. In this state, the power supply voltage Vcc is applied to the gate of the transistor Q1 through the resistor R5, and thereby the transistor Q1 becomes the ON state and forms the current path to the drive motor M1.

While the collector of the transistor Q2 is directly connected to the gate of the transistor Q1 in the present embodiment, the collector of the transistor Q2 may be connected to the gate of the transistor Q1 through a drive circuit for switching the transistor Q1.

[Circuit Configuration of the Battery Pack 40]

The Battery pack 40 includes a positive terminal 44A and a negative terminal 4413 provided in the power supply terminal portion 44, three signal terminals 46A, 46B, and 46C provided in the connection terminal portion 46, the battery 50, and a control circuit 60.

A positive terminal 52A of the battery 50 is connected to the positive terminal 44A through the positive power supply line L2A, while a negative terminal 52B of the battery 50 is connected to the negative terminal 44B through the negative power supply line L2B.

When the battery pack 40 is attached to the main body 10, the positive terminal 44A is connected to the positive terminal 32A of the main body 10, the negative terminal 44B is connected to the negative terminal 32B of the main body 10, and the signal terminal 46A is connected to the signal terminal 34A of the main body 10.

Signal terminals 46B and 46C are designed to be connected to a connection terminal portion of the battery charger when the battery pack 40 is attached to the battery charger, and to be in an open state when the battery pack 40 is attached to the main body 10.

The battery 50 is constituted by a plurality of (for example, ten) battery cells connected in series between the positive terminal 52A and the negative terminal 52B, and generates a drive voltage (for example, a 36V direct current voltage) for driving the drive motor M1.

Each of the battery cells is constituted, for example, as a lithium-ion battery which generates a 3.6V direct current voltage. Therefore, the battery 50 can output high-power. The maximum discharge current that the battery 50 is capable of outputting is, for example, at least 10A.

The control circuit 60 includes a current measurement circuit 62, a voltage measurement circuit 64, a temperature measurement circuit 66, a switch operation detection circuit 68, a battery charger detection circuit 72, the indicator switch 80 and the indicator portion 86 shown in FIG. 2, a Main Control Unit (MCU) 70, and a transistor Q4.

The current measurement circuit 62 here is designed to detect a current flowing in the positive power supply line L2A or the negative power supply line L2B, and outputs to the MCU 70 a current detection signal having a voltage value corresponding to a magnitude of the detected current.

The voltage measurement circuit 64 measures voltages of the respective battery cells constituting the battery 50 in sequence, and outputs to the MCU 70 voltage detection signals having voltage values corresponding to respective magnitudes of the measured voltages.

The temperature measurement circuit 66, which includes a thermistor (not shown) disposed around the battery 50, measures a battery temperature through the thermistor, and outputs to the MCU 70 a temperature detection signal having a voltage value corresponding to the measured temperature.

The switch operation detection circuit 68, which is designed to detect that the trigger switch 22 of the main body 10 is operated, includes a transistor Q3, resistors R6, R7, and R8.

The transistor Q3 constituted as an NPN bipolar transistor has a base which is connected to a signal terminal 46A through the resistor R6 and connected to the ground of the battery pack 40 through the resistor R7. Also, an emitter of the transistor Q3 is connected to the ground.

The ground of the battery pack 40 is connected to the negative power supply line L2B. Accordingly, when the battery pack 40 is attached to the main body 10, the ground of the battery pack 40 and the ground of the main body 10 have a same electric potential, and each of these grounds has the same electrical potential as the negative terminal of the battery 50.

A collector of the transistor Q3 is connected to the MCU 70 and also connected, through the resistor R8, to an output path of a power supply voltage Vdd (for example, a 5V direct current voltage) from a control power circuit (not shown) provided in the battery pack 40. The control power circuit is designed to receive power supply from the battery 50, generate a given power supply voltage Vdd, and perform power supply to various electronic circuits in the battery pack 40. The control power circuit is constituted by, for example, a switching power circuit or the like.

The transistor Q4 constituted as an N-channel MOSFET has a drain which is connected to the signal terminal 46A, to which the base of the transistor Q3 is connected through the resistor R6. A source of the transistor Q4 is connected to the ground and a gate of the transistor Q4 is connected to the MCU 70.

Accordingly, the transistor Q4 is turned on or off by an output signal (a later-described discharge control signal) from the MCU 70. When the transistor Q4 is in an OFF state, the signal terminal 46A is in an open state.

When the battery pack 40 is attached to the main body 10 and the trigger switch 22 is operated (the main switch SW1: ON) with the transistor Q4 in the OFF state, a high level signal corresponding to the power supply voltage Vcc in the battery pack 40 is inputted from the signal terminal 34A of the main body 10 to the signal terminal 46A of the battery pack 40. Then, the transistor Q3 in the switch operation detection circuit 68 is turned to the ON state, and an input signal from the switch operation detection circuit 68 to the MCU 70 becomes low level.

When the battery pack 40 is attached to the main body 10 but the trigger switch 22 is not operated (the main switch SW1: OFF), the signal terminal 34A of the main body 10 is low level (a ground potential). Then, the transistor Q3 in the switch operation detection circuit 68 is in the OFF state, and an input signal from the switch operation detection circuit 68 to the MCU 70 becomes high level.

The battery charger detection circuit 72 is designed such that when the battery pack 40 is attached to the battery charger and a high level signal (of, for example, a 5V direct current) is inputted from the battery charger to the signal terminal 46C, the battery charger detection circuit 72 outputs a detection signal indicating the fact into the MCU 70. The battery charger detection circuit 72 is configured in a same manner as the switch operation detection circuit 68.

Specifically, when the signal terminal 46C is in the open state, the battery charger detection circuit 72 outputs a high level signal corresponding to the power supply voltage Vdd to the MCU 70 through a pull-up resistor. When a high level signal is inputted from the battery charger to the signal terminal 46C, a transistor connected to a signal path to the MCU 70 is turned to the ON state, and the signal path is connected to the ground to make the output to the MCU 70 low level.

Accordingly, the MCU 70 can detect that the trigger switch 22 has been operated in the main body 10, to which the battery pack 40 is attached, based on the output signal from the switch operation detection circuit 68, and also can detect that the battery pack 40 has been attached to the battery charger based on the output signal from the battery charger detection circuit 72.

The MCU 70 is constituted as a known microcomputer including at least a CPU 701, a ROM 702, a RAM 703, a rewritable nonvolatile memory (not shown), an input/output (I/O) port (not shown), and an A/D converter (not shown). The MCU 70 executes a variety of control processes for charging/discharging the battery 50 and for indicating a status of the battery 50 in accordance with a variety of programs stored in the ROM 702.

[Indication Control by the MCU 70]

A description will be provided on an indication control process to be executed in order to indicate in the indicator portion 86 a remaining capacity of the battery 50 and a remaining time until overload protection activates among the variety of control processes to be executed by the MCU 70 in the battery pack 40.

Indication of the remaining capacity of the battery 50 in the indicator portion 86 is performed according the steps of calculating the remaining capacity of the battery 50 based on detection signals from the current measurement circuit 62 and the voltage measurement circuit 64 (in other words, a current flowing through the battery 50 and a battery voltage), and, when the indicator switch 80 is pressed down, and indicating the calculated remaining capacity in the indicator portion 86 for a pre-set time period.

Lighting patterns of the indicator elements 81 to 84 for indication of the remaining capacity are pre-set as shown in FIG. 4A. Specifically, when the remaining capacity is in a range of "0% to 25%", only the indicator element 81 (a first LED) is turned on and the other indicator elements 82 to 84 (a second to a fourth LEDs) are turned off.

When the remaining capacity is in a range of "25% to 50%", the two indicator elements 81 and 82 (the first and the second LEDs) are turned on and the other two indicator elements 83 and 84 (the third and the fourth LEDs) are turned off. When the remaining capacity is in a range of "50% to 75%", the three indicator elements 81 to 83 (the first to the third LEDs) are turned on and the other indicator element 84 (the fourth LED) is turned off.

When the remaining capacity is in a range of "75% to 100%", all the indicator elements 81 to 84 (the first to the fourth LEDs) are turned on.

Indication of a remaining time until overload protection activates is performed by the MCU 70 repeatedly executing an overload protection determination process as shown in FIG. 5 as part of a main routine while the battery pack 40 is attached to the main body 10.

The overload protection determination process is a process in which a load condition of the battery 50 is monitored based on a discharge current and a battery temperature measured respectively by the current measurement circuit 62 and the temperature measurement circuit 66, and if the battery 50 is in an overload state, a discharge control signal is made to a low level to thereby prohibit discharge from the battery 50 to the drive motor M1.

The overload protection determination process will be described hereinafter in accordance with the flowchart in FIG. 5. The overload protection determination process is executed at specified intervals (for example, every 0.5 seconds) by the MCU 70. When the process is started, a discharge current and a battery temperature are first read respectively from the current measurement circuit 62 and the temperature measurement circuit 66 in S110 (S means "Step").

Next, in S120, an addition/subtraction value for updating an overcurrent counter is calculated based on the discharge current and the battery temperature read in S110, and the calculated addition/subtraction value is added to the overcurrent counter, to thereby update the overcurrent counter.

The overcurrent counter is designed to store a magnitude of load on the battery 50 as a count value. In the present embodiment, the count value is also used as a "time equivalent value" representing a remaining time until the battery 50 reaches the overload state.

Figure 6:
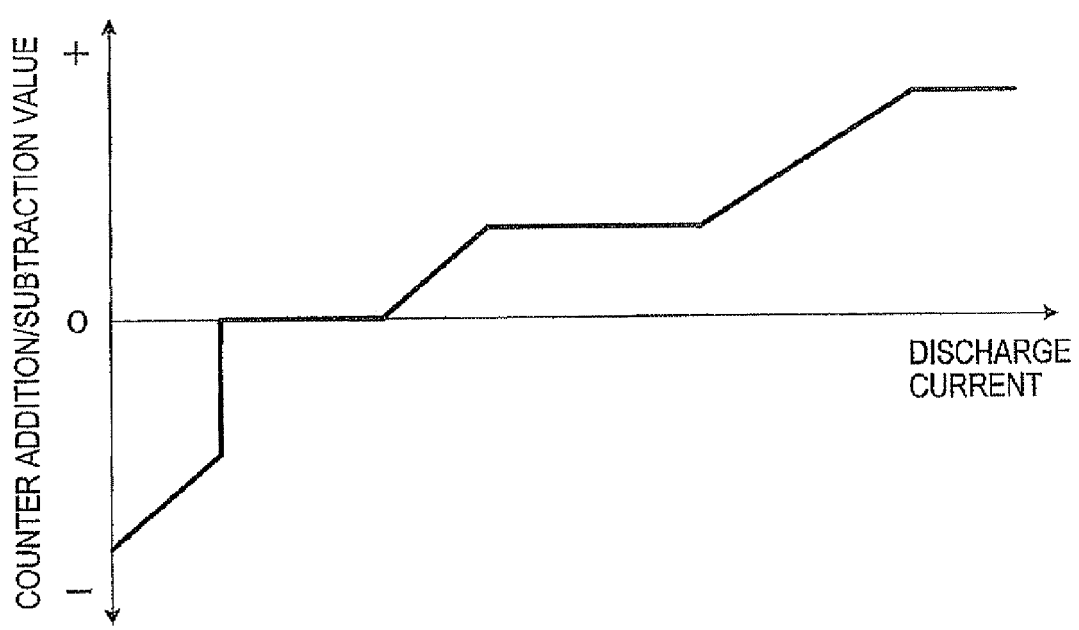
FIG. 6 is an explanatory view showing a map for calculating a counter addition/subtraction value.

In S120, the addition/subtraction value to update the overcurrent counter is calculated based on the discharge current and the battery temperature. A plurality of maps, for example, are employed for the calculation. In each of the plurality of maps, as shown in FIG. 6, for example, zero or a negative value is set as the addition/subtraction value against the discharge current lower than a threshold value, while a positive value is set as the addition/subtraction value against the discharge current equal to or more than the threshold value. The plurality of maps are prepared for respective predetermined temperature ranges of the battery 50.

In S120, the MCU 70 selects a map corresponding to the battery temperature, and calculates an addition/subtraction value corresponding to the discharge current using the selected map. The map for calculation of the addition/subtraction value shown in FIG. 6, is adopted such that the larger the discharge current is, the larger the addition/subtraction value becomes. The plurality of maps with mutually different temperature ranges are adopted such that the higher the battery temperature is, the larger the addition/subtraction value becomes.

This is because the battery 50 is heated more easily as the discharge current is larger, and is prone to be deteriorated as the battery temperature (specifically, a surface temperature of the battery 50, and thus an ambient temperature) is higher.

It is not necessarily required to employ the above-mentioned maps when calculating the addition/subtraction value in S120. Instead, a two-dimensional map, in which the discharge current and the battery temperature are used as parameters, or an arithmetic expression, in which the values of the discharge current and the battery temperature are used as parameters, may be employed.

When the overcurrent counter is updated in S120, the process proceeds to S130, and it is determined whether or not a discharge current is currently flowing. When it is determined in S130 that a discharge current is not flowing, the process proceeds to S140, and the lighting pattern of the indicator portion 86 is set such that all the indication elements (LEDs) 81 to 84 of the indicator portion 86 are turned off, and then the process proceeds to S150.

When it is determined in S130 that a discharge current is currently flowing, the process proceeds to S160, and it is determined whether or not a value of the overcurrent counter is larger than an overload determination value $\alpha 4$. When the value of the overcurrent counter is larger than the overload determination value $\alpha 4$, it is determined that the battery 50 is in the overload state, and then the process proceeds to S170.

In S170, the discharge control signal is made to a low level to thereby cause overload protection to activate so that the transistor Q2 is turned on and the transistor Q1 is turned off in the main body 10 to prohibit discharge from the battery 50 to the drive motor M1.

Also in S170, a lighting pattern is set, as a lighting pattern for indicating the remaining time until overload protection activates, such that only the indicator element 81 (the first LED) of the indicator portion 86 blinks and the other indicator elements 82 to 84 (the second to the fourth LEDs) are turned off (see FIG. 4B). After the processing in S170, the process proceeds to S150.

As shown in FIG. 4B, the lighting pattern is set as follows: When the value of the overload counter exceeds a first set value $\alpha 1$, all the indicator elements 81 to 84 (the first to the fourth LEDs) of the indicator portion 86 blink. As the value of the overload counter becomes larger from the first set value $\alpha 1$ to a second set value $\alpha 2$, to a third set value $\alpha 3$, and to the overload determination value $\alpha 4$, a number of indicator elements to blink decreases in a stepwise manner, to thereby notify a user of the electric power tool of the remaining time until overload protection activates.

When it is determined in S160 that the value of the overcurrent counter is equal to or less than the overload determination value $\alpha 4$, the process proceeds to S180. In S180, it is determined whether or not the value of the overcurrent counter is larger than the third set value $\alpha 3$ ($\alpha 3 < \alpha 4$) for determination of the remaining time.

When the value of the overcurrent counter is larger than the third set value $\alpha 3$, the process proceeds to S190. In S190, a lighting pattern is set, as the lighting pattern for indicating the remaining time, such that the two indicator elements 81 and 82 (the first and the second LEDs) of the indicator portion 86 blink and the other indicator elements 83 and 84 (the third and the fourth LEDs) are turned off. Then, the process proceeds to S150.

When it is determined in S180 that the value of the overcurrent counter is equal to or less than the third set value α3, the process proceeds to S200, and it is determined whether or not the value of the overcurrent counter is larger than the second set value α2 (α2<α3) for determination of the remaining time.

When it is determined in S200 that the value of the overcurrent counter is larger than the second set value α2, the process proceeds to S210. In S210, a lighting pattern is set, as the lighting pattern for indicating the remaining time, such that the three indicator elements 81 to 83 (the first to the third LEDs) of the indicator portion 86 blink and the other indicator element 84 (the fourth LED) is turned off. Then, the process proceeds to S150.

When it is determined in S200 that the value of the overcurrent counter is equal to or less than the second set value α2, the process proceeds to S220, and it is determined whether or not the value of the overcurrent counter is larger than the first set value α1 (α1<α2) for determination of the remaining time.

When the value of the overcurrent counter is larger than the first set value α1, the process proceeds to S230. In S230, a lighting pattern is set, as the lighting pattern for indicating the remaining time, such that all the indicator elements 81 to 84 (the first to the fourth LEDs) of the indicator portion 86 blink. Then, the process proceeds to S150.

When it is determined in S220 that the value of the overcurrent counter is equal to or less than the first set value α1, it is determined that overload protection will not activate in a present load condition of the battery 50, and the process proceeds to S140. In S140, a lighting pattern is set such that all the indicator elements 81 to 84 (the first to the fourth LEDs) of the indicator portion 86 are turned off. Then, the process proceeds to S150.

In S150, an LED lighting process to indicate the remaining time until the battery 50 reaches the overload state and overload protection activates is performed by causing the indicator elements 81 to 84 of the indicator portion 86 to blink in accordance with the lighting pattern of the indicator portion 86 set in S140, S170, S190, S210, or S230. Then, the indication control process is temporarily terminated.

[Effects of the Embodiment]

Figure 7:
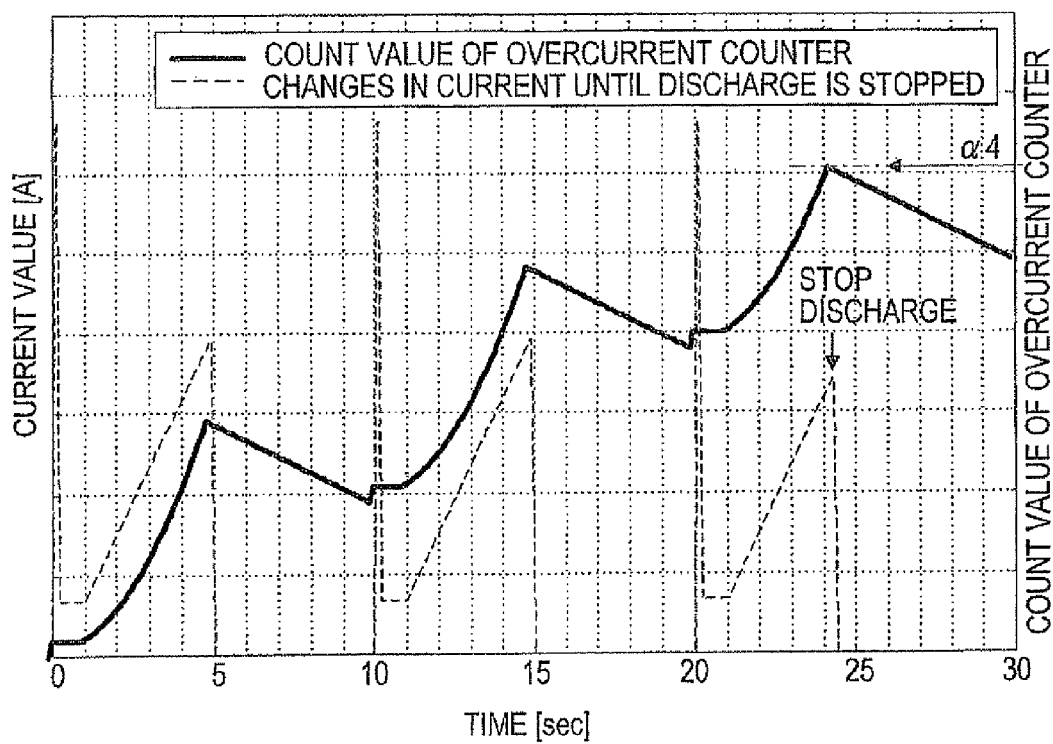
FIG. 7 is an explanatory view showing changes in a counted value of an overcurrent counter and a discharge stop operation.

In the present embodiment, as described above, the MCU 70 in the battery pack 40 monitors the load condition of the battery 50 by sequentially updating the overload counter based on the discharge current and the battery temperature, as exemplarily shown in FIG. 7.

When the value of the overcurrent counter exceeds the overload determination value α4, the MCU 70 determines that the battery 50 has reached the overload state, and stops discharge from the battery 50, to thereby protect the battery 50 from the overload state.

Until the value of the overcurrent counter reaches the overload determination value α4, the value of the overcurrent counter represents a time until the MCU 70 initiates overload protection. In the present embodiment, therefore, the value of the overcurrent counter is used as a time equivalent value representing the remaining time until the MCU 70 initiates overload protection.

When the value of the overcurrent counter exceeds the first set value α1 as a result of discharge of the battery 50, the MCU 70 causes all the indicator elements 81 to 84 (the first to the fourth LEDs) of the indicator portion 86 to blink, to thereby notify the user that overload protection may activate and thus stop the electric power tool.

Also, the MCU 70 notifies the user of the remaining time until overload protection activates by reducing the number of blinking indicator elements as the value of the overcurrent counter becomes larger from the first set value α1 to the second set value α2, to the third set value α3, and to the overload determination value α4.

Since the lighting pattern for notification of the remaining time is constituted by causing the indicator elements (LEDs) to blink, unlike the lighting pattern for indicating the remaining capacity, the user can detect the remaining time until overload protection activates based on the number of blinking indicator elements (LEDs) while using the electric power tool.

Accordingly, the user can temporarily terminate a work with use of the electric power tool and stop driving of the electric power tool before the remaining time has elapsed. Therefore, the electric power tool can be suppressed from being unusable for a long time period from when operation of the electric power tool is forcibly stopped by an overload protection function until when it is determined that the electric power tool has recovered to a normal state.

Also, in the present embodiment, since the remaining time until overload protection activates can be notified to the user of the electric power tool using the indicator portion 86, which is used for indicating the remaining capacity of the battery 50, it is not required to provide a separate indicator portion for notification of the remaining time. Accordingly, a constitution of the apparatus can be simplified, and thereby increase in cost of the electric power tool (i.e., the battery pack 70 in the present embodiment) can be suppressed.

In the present embodiment, the current measurement circuit 62 and the temperature measurement circuit 66, which are used for updating the overcurrent counter as the time-equivalent value, corresponds to an example of a detection unit of the present invention. The MCU 70, which executes the processing in S120 to update the overcurrent counter in the overload protection determination process shown in FIG. 5, corresponds to an example of a calculation unit of the present invention.

Also, the processings in S140 to S230 to set the lighting pattern of the indicator portion 86 based on the value of the overcurrent counter and control the blinking state of each of the indicator elements 81 to 84 of the indicator portion 86 in the overload protection determination process corresponds to an example of a notification unit and an example of a notification step of the present invention. Further, the processing in S160 corresponds to an example of a determination unit and an example of a determination step of the present invention, and the processing in S170 corresponds to an example of a protection unit and an example of a protection step of the present invention.

MODIFIED EXAMPLES

Although one embodiment of the present invention has been described above, the present invention should not be limited to the above-described embodiment, but may be practiced in various forms without departing from the gist of the present invention.

For example, while the discharge current and the battery temperature are used to calculate an addition/subtraction value of the overcurrent counter in the above-described embodiment, only the discharge current may be used to calculate the addition/subtraction value or only the battery temperature may be used to calculate the addition/subtraction value.

That is, with such configuration, the overcurrent counter may be updated as an integrated value of the discharge current or an integrated value of the battery temperature, and the overcurrent counter may be used as a parameter representing the magnitude of a load on the battery 50 (and thus representing the remaining time until overload protection activates).

In the above-described embodiment, the overcurrent counter is updated based on the discharge current and the battery temperature, and determination about overload and determination on the remaining time are performed based on the value of the overcurrent counter. However, determination about overload and determination on the remaining time may be performed by performing an overload protection determination process according to, for example, a process shown in FIGS. 8A and 8B.

Figure 8A:
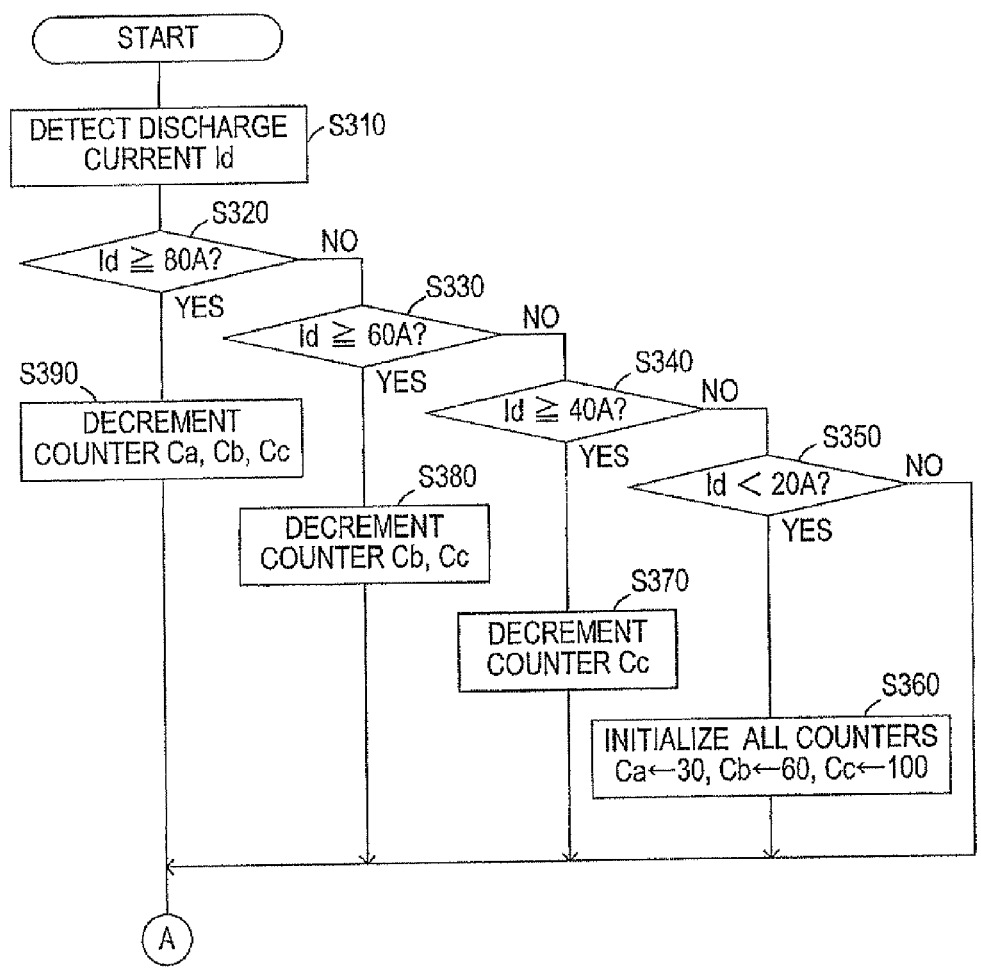
FIGS. 8A and 8B are a flowchart showing another overload protection determination process performed based on a discharging current.
Figure 8B:
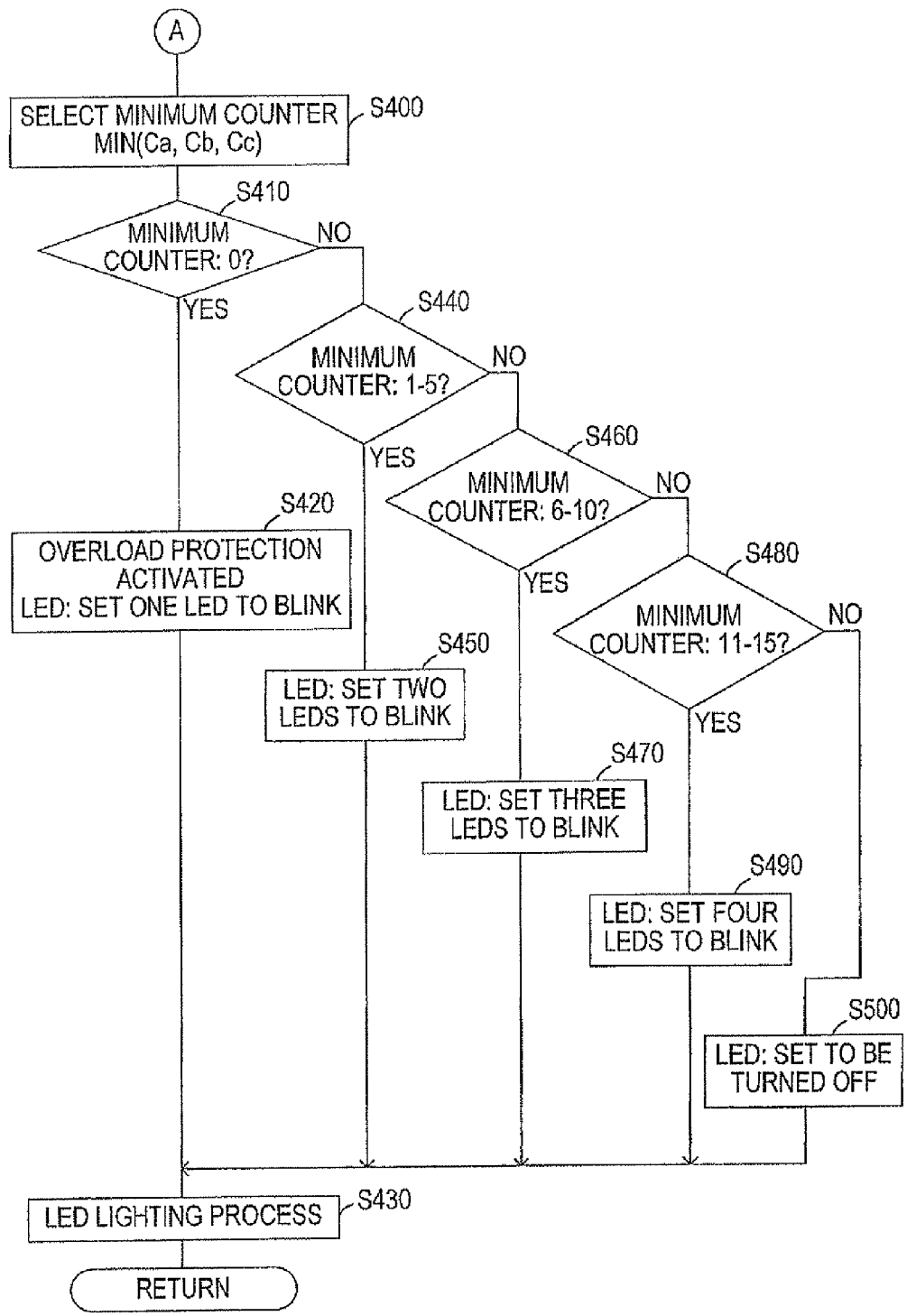

Therefore, a description of the overload protection determination process shown in FIGS. 8A and 8B will next be provided. In the overload protection determination process shown in FIGS. 8A and 8B, a plurality of (three in the present example) counters Ca, Cb, and Cc for calculating the remaining time are updated based on the discharge current measured in the current measurement circuit 62, and determination about overload and determination on the remaining time are performed based on values of the counters Ca, Cb, and Cc, respectively.

The overload protection determination process is performed as part of a main routine at specified intervals (for example, every one second) by the MCU 70 in a same manner as the overload protection determination process shown in FIG. 5.

As shown in FIGS. 5A and 5B, when the overload protection determination process is started, a discharge current Id of the battery 50 is first read from the current measurement circuit 62 in S310, and it is determined subsequently in S320 whether or not the discharge current Id is equal to or more than a fourth threshold value (for example, 80A).

When the discharge current Id has not reached the fourth threshold value, the process proceeds to S330, and it is determined whether or not the discharge current Id is equal to or more than a third threshold value (for example, 60A). When the discharge current Id has not reached the third threshold value, the process proceeds to S340.

In S340, it is determined whether or not the discharge current Id is equal to or more than a second threshold value (for example, 40A). When the discharge current Id has not reached the second threshold value, the process proceeds to S350, and it is determined whether or not the discharge current Id is less than a first threshold value (for example, 20A).

When it is determined in S350 that the discharge current Id is not less than the first threshold value, the process proceeds to S400, while when it is determined in S350 that the discharge current Id is less than the first threshold value (in other words, when the battery 50 is unlikely to reach the overload state), the process proceeds to S360. In S360, initial values are set to all the respective counters Ca to Cc for calculation of the remaining time, and then the process proceeds to S400.

The counter Ca is an 80A-or-more counter which is updated (i.e., counted down) in a later-described process when the discharge current Id is equal to or more than the fourth threshold value (80A). The counter Cb is a 60A-or-more counter which is updated (i.e., counted down) in the later-described process when the discharge current Id is equal to or more than the third threshold value (60A). The counter Cc is a 40A-or-more counter which is updated (i.e., counted down) in the later-described process when the discharge current Id is equal to or more than the second threshold value (40A).

In S360, an initial value "30" is set to the 80A-or-more counter Ca, an initial value "60", which is larger than that at the counter Ca, is set to the 60A-or-more counter Cb, and an initial value "100", which is larger than those at the counter Ca and Cb, is set to the 40A-or-more counter Cc.

When it is determined in S340 that the discharge current Id is equal to or more than the second threshold value (40A), the 40A-or-more counter Cc is decremented (−1) in S370, and the process proceeds to S400.

When it is determined in S330 that the discharge current Id is equal to or more than the third threshold value (60A), each of the 60A-or-more counter Cb and the 40A-or-more counter Cc is decremented (−1) in S380, and the process proceeds to S400.

When it is determined in S320 that the discharge current Id is equal to or more than the fourth threshold value (80A), each of the 80A-or-more counter Ca, the 60A-or-more counter Cb, and the 40A-or-more counter Cc is decremented (−1) in S390, and the process proceeds to S400.

In S400, a minimum counter having a minimum count value is selected from among the counters Ca to Cc which are updated in the processings in S360 to S390.

In subsequent S410, it is determined whether or not the value of the selected minimum counter is a minimum value "0" for determination about overload. When the value of the selected minimum counter is the minimum value "0", it is determined that the battery 50 has reached the overload state, and the process proceeds to S420.

In S420, the discharge control signal is made to a low level to thereby cause overload protection to activate so that the transistor Q2 is turned on and the transistor Q1 is turned off in the main body 10 to prohibit discharge from the battery 50 to the drive motor M1.

Also in S420, a lighting pattern is set, as the lighting pattern for indicating the remaining time, such that only the indicator element 81 (the first LED) of the indicator portion 86 blinks and the other indicator elements 82 to 84 (the second to the fourth LEDs) are turned off. After the processing in S420, the process proceeds to S430.

When it is determined in S410 that the value of the minimum counter is not the minimum value "0", the process proceeds to S440, and it is determined whether or not the value of the minimum counter is within a range of "1" to "5".

When the value of the minimum counter is within the range of "1" to "5", the process proceeds to S450, and a lighting pattern is set, as the lighting pattern for indicating the remaining time, such that the two indicator elements 81 and 82 (the first and the second LEDs) of the indicator portion 86 blink and the other indicator elements 83 and 84 (the third and the fourth LEDs) are turned off. Then, the process proceeds to S430.

When it is determined in S440 that the value of the minimum counter is not within the range of "1" to "5", the process proceeds to S460, and it is determined whether or not the value of the minimum counter is within a range of "6" to "10".

When the value of the minimum counter is within the range of "6" to "10", the process proceeds to S470, and a lighting pattern is set, as the lighting pattern for indicating the remaining time, such that the three indicator elements 81 to 83 (the first to the third LEDs) of the indicator portion 86 blink and the other indicator element 84 (the fourth LED) is turned off. Then, the process proceeds to S430.

When it is determined in S460 that the value of the minimum counter is not within the range of "6" to "10", the process proceeds to S480, and it is determined whether or not the value of the minimum counter is within a range of "11" to "15".

When the value of the minimum counter is within the range of "11" to "15", the process proceeds to S490, and a lighting pattern is set, as the lighting pattern for indicating the remaining time, such that all the four indicator elements 81 to 84 (the first to the fourth LEDs) of the indicator portion 86 blink. Then, the process proceeds to S430.

When it is determined in S480 that the value of the minimum counter is not within the range of "11" to "15" (in other words, equal to or more than "16"), it is determined that overload protection will not activate in a current load condition of the battery 50, and the process proceeds to S500. In S500, a lighting pattern is set such that all the indicator elements 81 to 84 (the first to the fourth LEDs) of the indicator portion 86 are turned off. Then, the process proceeds to S430.

In S430, in a same manner as in S150 of the above-described embodiment, an LED lighting process to indicate the remaining time until the battery 50 reaches the overload state and overload protection activates is performed by causing the indicator elements 81 to 84 of the indicator portion 86 to blink in accordance with the lighting pattern of the indicator portion 86 set in S420, S450, S470, S490, or S500. Then, the present indication control process is temporarily terminated.

As described above, in the overload protection determination process shown in FIGS. 8A and 8B, the plurality of counters Ca, Cb, and Cc for calculating the remaining time are updated (counted down) based on the discharge current Id from the battery 50, and the counter having the minimum count value is selected as the minimum counter, to thereby obtain the value of the minimum counter as the time equivalent value representing the remaining time until overload protection activates. Then, the lighting pattern of the indicator portion 86 is set in accordance with the value of the minimum counter, as the time equivalent value, to thereby notify the user of the electric power tool of the remaining time until overload protection activates.

Accordingly, also in a case where the MCU 70 performs the overload protection determination process shown in FIGS. 8A and 8B, the user can detect the remaining time until overload protection activates and temporarily terminate the current work with use of the electric power tool before the remaining time has elapsed. Thus, the same effects as in the above-described embodiment can be obtained.

In the overload protection determination process shown in FIGS. 8A and 8B, the processings in S310 to S400 to update the count values of the counters Ca to Cc based on the discharge current Id and select the minimum counter having the minimum count value from among the counters Ca to Cc correspond to an example of a calculation unit and an example of a calculation step of the present invention.

Also, in the overload protection determination process shown in FIGS. 8A and 8B, the processings in S410 to S430 to set the lighting pattern of the indicator portion 86 in accordance with the value of the minimum counter and control the blinking state of each of the indicator elements 81 to 84 of the indicator portion 86 correspond to an example of a notification unit and an example of a notification step of the present invention. Further, the processing in S410 corresponds to an example of a determination unit and an example of a determination step of the present invention, and the processing in S420 corresponds to an example of a protection unit and an example of a protection step of the present invention.

Figure 9A:
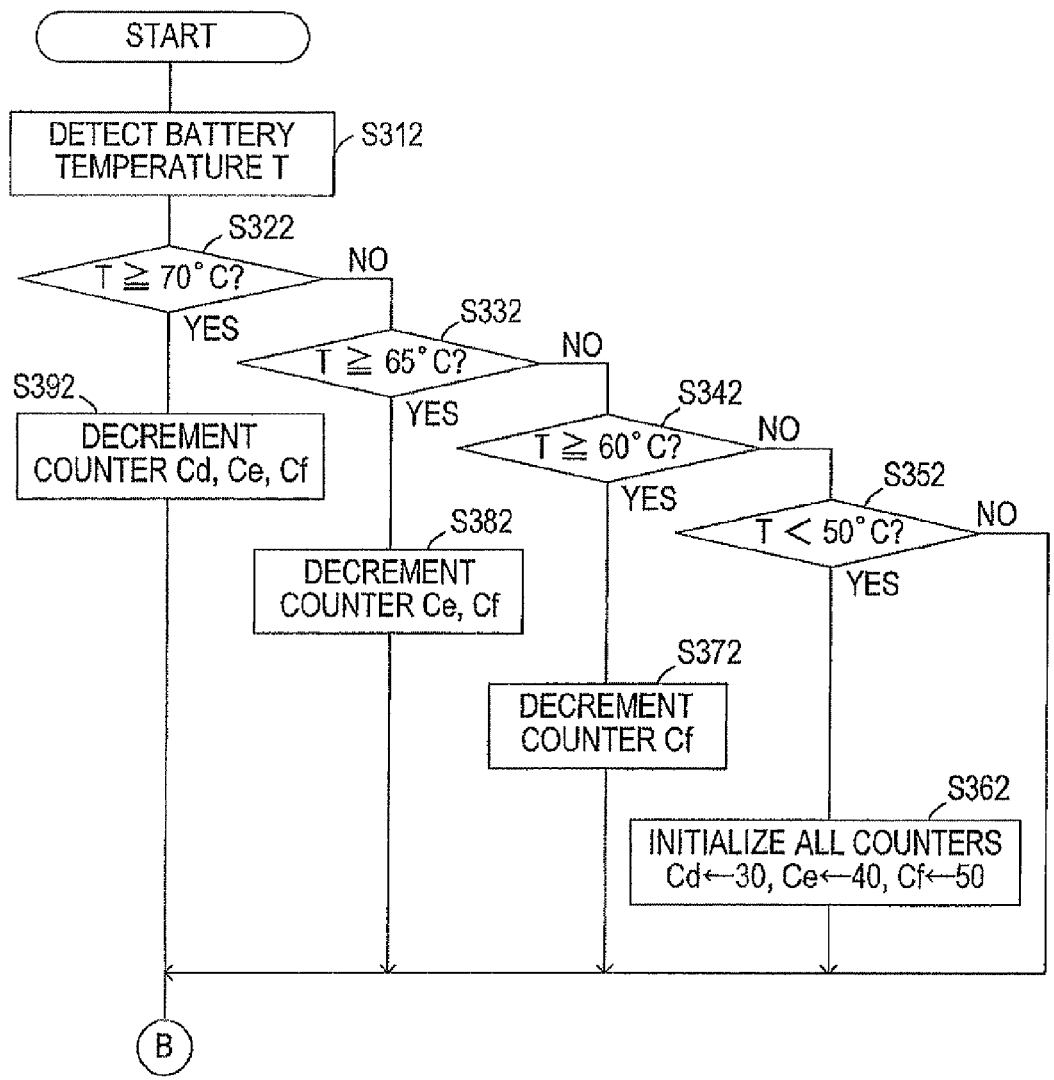
FIGS. 9A and 9B are a flowchart showing still another overload protection determination process performed based on a temperature of the battery.
Figure 9B:
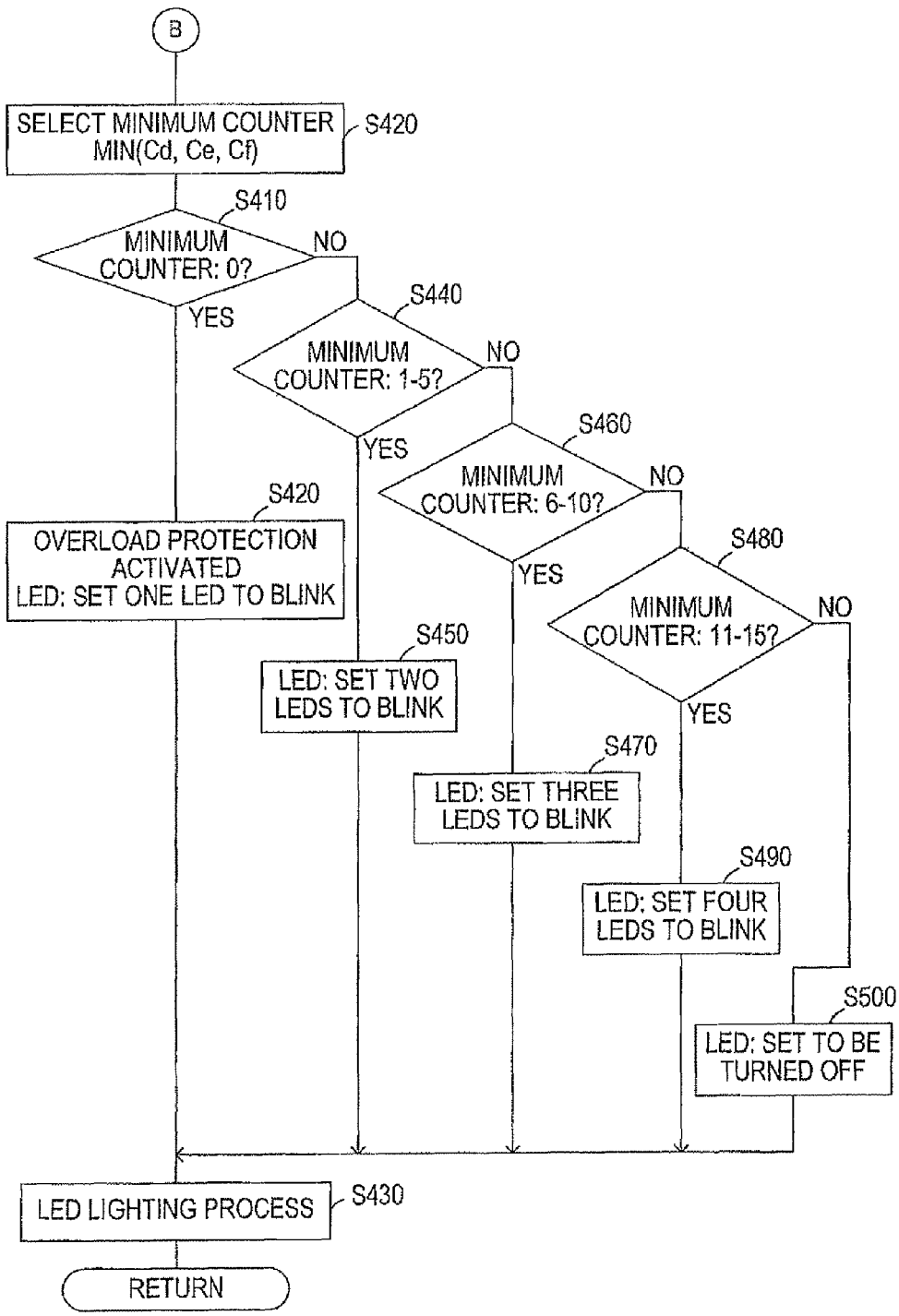

Although the overload protection determination process shown in FIGS. 8A and 8B is configured such that the plurality of counters Ca, Cb, and Cc for calculating the remaining time are updated (counted down) based on the discharge current Id from the battery 50, the overload protection determination process may be performed such that a plurality of counters Cd, Ce, and Cf for calculating the remaining time are updated (counted down) based on a battery temperature T measured by the temperature measurement circuit 66 as shown in FIGS. 9A and 9B (S312 to S392).

That is, even with this configuration, it may be possible that a minimum counter having a minimum count value is selected from among the counters Cd, Ce, and Cf in S402 and a lighting pattern of the indicator portion 86 is set based on the value of the minimum counter in processings of subsequent S410 to S500, to thereby notify the user of the electric power tool of the remaining time until overload protection activates.

In the overload protection determination process shown in FIGS. 9A and 9B, the values of the counters Cd, Ce, and Cf are updated based on the battery temperature T such that all the counters Cd, Ce, and Cf are set to initial values "30", "40", "50", respectively, when the battery temperature T has not reached 50° C. (S362), a value of each of the counters Cd, Ce, and Cf is decremented when the battery temperature T is equal to 70° C. or more (S392), a value of each of the counters Ce and Cf is decremented when the battery temperature T is equal to 65° C. or more (S382), and a value of the counter Cf is decremented when the battery temperature T is equal to 60° C. or more (S372).

In the above-described embodiment and the modified example, the overload protection determination process shown in each of FIG. 5, FIGS. 8A and 8B, and FIGS. 9A and 9B is performed by the MCU 70 in the battery pack 40 as an apparatus for an electric power tool. However, it may be configured such that an MCU for discharge control is provided in the main body 10 as another apparatus for an electric power tool, and an overload protection determination process is performed by the MCU 70.

In the above-described embodiment, the description has been given regarding a case where the present invention is applied to a driver drill. However, the present invention may be applied to any apparatus for an electric power tool (i.e., a battery pack, a main body of the electric power tool, etc.) which constitutes an electric power tool other than a driver drill.

Although a brushed direct current motor is employed as the drive motor M1 in the above-described embodiment, a brushless direct current motor or an alternating current motor may be employed instead. However, in a case of employing a brushless direct current motor or an alternating current motor as the drive motor M1, it is required to configure the main body 10 accordingly.

What is claimed is:
1. An apparatus for an electric power tool comprising:
a detection unit that detects at least one physical quantity representing a load condition of a battery as a power source of the electric power tool;
a determination unit that determines whether or not the battery has reached an overload state based on the result of the detection by the detection unit;
a protection unit that interrupts a discharge path from the battery to thereby protect the battery when the determination unit determines that the battery has reached the overload state;
a calculation unit that calculates, based on the result of the detection by the detection unit, a time-equivalent value representing a remaining time until the load condition of the battery reaches the overload state, in which the protection unit interrupts the discharge path; and a notification unit that notifies a user of the electric power tool of a remaining time until the protection unit interrupts the discharge path based on the time-equivalent value calculated by the calculation unit.

2. The apparatus according to claim 1,
wherein the detection unit detects a temperature of the battery as the at least one physical quantity, and
wherein the calculation unit calculates the time-equivalent value based on the temperature of the battery detected by the detection unit.

3. The apparatus according to claim 1,
wherein the detection unit detects a discharge current flowing in the discharge path as the at least one physical quantity, and
wherein the calculation unit calculates the time-equivalent value based on the discharge current detected by the detection unit.

4. The apparatus according to claim 1,
wherein the detection unit detects a temperature of the battery and a discharge current flowing in the discharge path as the at least one physical quantity, and
wherein the calculation unit calculates the time-equivalent value based on the temperature of the battery and the discharge current detected by the detection unit.

5. The apparatus according to claim 1, wherein the notification unit controls an indicator element, which is provided in the apparatus to indicate a remaining capacity of the battery, in a different manner of indication from a manner of indication of the remaining capacity of the battery, to thereby notify the user of the remaining time until the protection unit interrupts the discharge path.

6. A non-transitory recording medium readable by a computer, the non-transitory recording medium storing a program for causing the computer to execute:
a detection step of detecting at least one physical quantity representing a load condition of a battery as a power source of an electric power tool;
a determination step of determining whether or not the battery has reached an overload state based on the result of the detection in the detection step;
a protection step of interrupting a discharge path from the battery to thereby protect the battery when it is determined in the determination step that the battery has reached the overload state;
a calculation step of calculating, based on the result of detection in the detection step, a time-equivalent value representing a remaining time until the load condition of the battery reaches the overload state, in which the discharge path is interrupted in the protection step; and
a notification step of notifying a user of the electric power tool of a remaining time until the discharge path is interrupted in the protection step based on the time-equivalent value calculated in the calculation step.

* * * * *